United States Patent
Liu et al.

(10) Patent No.: US 10,139,933 B2
(45) Date of Patent: Nov. 27, 2018

(54) COLOR CONTROL OF TRACE OF DISPLAY DEVICE CONTROL PEN ON DISPLAY DEVICE

(71) Applicant: PEGATRON CORPORATION, Taipei (TW)

(72) Inventors: Che-Hsu Liu, Taipei (TW); Chi-Yen Chien, Taipei (TW); Kuang-Jen Fan, Taipei (TW); Tai-Jung Huang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 131 days.

(21) Appl. No.: 15/239,799

(22) Filed: Aug. 17, 2016

(65) Prior Publication Data

US 2017/0315632 A1    Nov. 2, 2017

(30) Foreign Application Priority Data

Apr. 29, 2016    (TW) .............................. 105113499 A

(51) Int. Cl.
*G06F 3/038*     (2013.01)
*G06F 3/0354*    (2013.01)
*G06F 3/0346*    (2013.01)

(52) U.S. Cl.
CPC .......... *G06F 3/0383* (2013.01); *G06F 3/0346* (2013.01); *G06F 3/03545* (2013.01)

(58) Field of Classification Search
CPC .......................... G06F 3/0383; G06F 3/03545
See application file for complete search history.

(56) References Cited

U.S. PATENT DOCUMENTS

2012/0331546 A1* 12/2012 Falkenburg ......... G06F 3/03545
                                                          726/16
2013/0135220 A1*  5/2013 Alameh .................. G06F 3/041
                                                          345/173

FOREIGN PATENT DOCUMENTS

| TW | 587216 B    | 5/2004  |
|----|-------------|---------|
| TW | 201413510 A | 4/2014  |
| TW | I459246 B   | 11/2014 |
| TW | 201602845 A | 1/2016  |

OTHER PUBLICATIONS

The office action of the corresponding Taiwan application dated Jan. 9, 2017.

* cited by examiner

*Primary Examiner* — Lisa Landis
(74) *Attorney, Agent, or Firm* — CKC & Partners Co., Ltd.

(57) ABSTRACT

A display device control pen comprises a pen body and at least one detachable accessory. The detachable accessory comprises an electronic component. The pen body is detachably assembled with the detachable accessory. The pen body comprises at least one variable-voltage circuit, a signal generating unit and a signal transmitter. When the detachable accessory is assembled to the pen body, the electronic component is electrically connected to the variable-voltage circuit and varies a voltage value of the variable-voltage circuit. The signal generating unit is coupled to the variable-voltage circuit and generates a color signal based on the varied voltage value. The signal transmitter is coupled to the signal generating unit and transmits the color signal to the display device, such that the display device displays a color on a trace formed by the pen body according to the color signal.

27 Claims, 14 Drawing Sheets

COLOR CONTROL OF TRACE OF DISPLAY DEVICE CONTROL PEN ON DISPLAY DEVICE

RELATED APPLICATIONS

This application claims priority to Taiwan Application Serial Number 105113499, filed Apr. 29, 2016, which is herein incorporated by reference.

BACKGROUND

Technical Field

The present disclosure relates to a display device control pen capable of controlling a trace formed by the display device control pen to display the color on the display device. In particular, the present disclosure further provides a display device control module and a display device control kit that include the display device control pen.

Description of Related Art

Because a touch display device allows an intuitively touch control operation, it is widely used in various portable electronic devices. In order to prevent from too many imprints left on the touch panel when the touch panel is touched by a finger, a stylus is therefore developed.

Take a capacitive touch display device for example, when the stylus touches a particular position on the touch panel, the capacitance of the sensing electrode on this position may vary such that the touch display device can obtain the touch position of the stylus, so as to execute a corresponding command. Take a graphic design program form example, when the stylus touches the touch panel and keeps moving on the touch panel, a control unit of the touch display device can request the display device to display a color on the trace formed by the stylus on the touch panel. Therefore, an experience like drawing on the paper can be brought to the user.

SUMMARY

Embodiments of the present disclosure allows the user to assemble the display device control pen with at least one detachable accessory, such that the display device can display a color on a trace formed by the pen body according to the color signal and the color signal is corresponding to the color signal of the detachable accessory, thereby improving interaction between the user and the display device.

In the present disclosure, a display device control pen comprises a pen body and at least one detachable accessory. The detachable accessory comprises an electronic component. The pen body is detachably assembled with the detachable accessory. The pen body comprises at least one variable-voltage circuit, a signal generating unit and a signal transmitter. When the detachable accessory is assembled to the pen body, the electronic component is electrically connected to the variable-voltage circuit and varies a voltage value of the variable-voltage circuit. The signal generating unit is coupled to the variable-voltage circuit and configured to generate a color signal based on the varied voltage value. The signal transmitter is coupled to the signal generating unit and configured to transmit the color signal to the display device, such that the display device is enabled to display a color on a trace formed by the pen body on the display device according to the color signal.

The present disclosure further discloses a display device control kit that comprises the aforementioned display device control pen, a penholder and at least one accessory securing structure. The penholder has a pen body accommodating recess. The pen body of the display device control pen is pluggably accommodated in the pen body accommodating recess. The accessory securing structure is located on the penholder and configured to secure the detachable accessory when the detachable accessory is detached from the pen body.

The present disclosure further discloses a display device control module that comprises a display device control pen and the display device. The display device control pen comprises at least one detachable accessory and a pen body. The detachable accessory comprises an electronic component. The pen body is detachably assembled with the detachable accessory. The pen body comprises at least one variable-voltage circuit and a signal transmitter. The electronic component is electrically connect to the variable-voltage circuit and varies a voltage value of the variable-voltage circuit when the detachable accessory is assembled to the pen body. The signal transmitter is coupled to the variable-voltage circuit and configured to transmit the varied voltage value of the variable-voltage circuit. The display device comprises a signal receiving unit, a signal generating unit and a display unit. The signal receiving unit is coupled to the signal transmitter and configured to receive the varied voltage value of the variable-voltage circuit sent from the signal transmitter. The signal generating unit is coupled to the signal receiving unit and configured to generate a color signal based on the varied voltage value, so that the display unit displays a color on a trace formed by the pen body on the display device according to the color signal.

The present disclosure further discloses a display device control kit that comprises the aforementioned display device control module, a penholder and at least one accessory securing structure. The penholder has a pen body accommodating recess. The pen body of the display device control pen is pluggably accommodated in the pen body accommodating recess. The accessory securing structure is located on the penholder and configured to secure the detachable accessory when the detachable accessory is detached from the pen body.

In the foregoing embodiments, since the electronic component of the detachable accessory can vary the voltage value of the variable-voltage circuit, and different voltage values correspond to different colors, the color displayed on the trace formed by the pen body on the display device can be determined by the varied voltage value. In other words, the color on the trace formed by the pen body on the display device can be determined by the electronic component of the detachable accessory. As a result, the user can use the detachable accessory assembled to the pen body to determine the color on the trace formed by the pen body on the display device, thereby improving interaction between the user and the display device.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
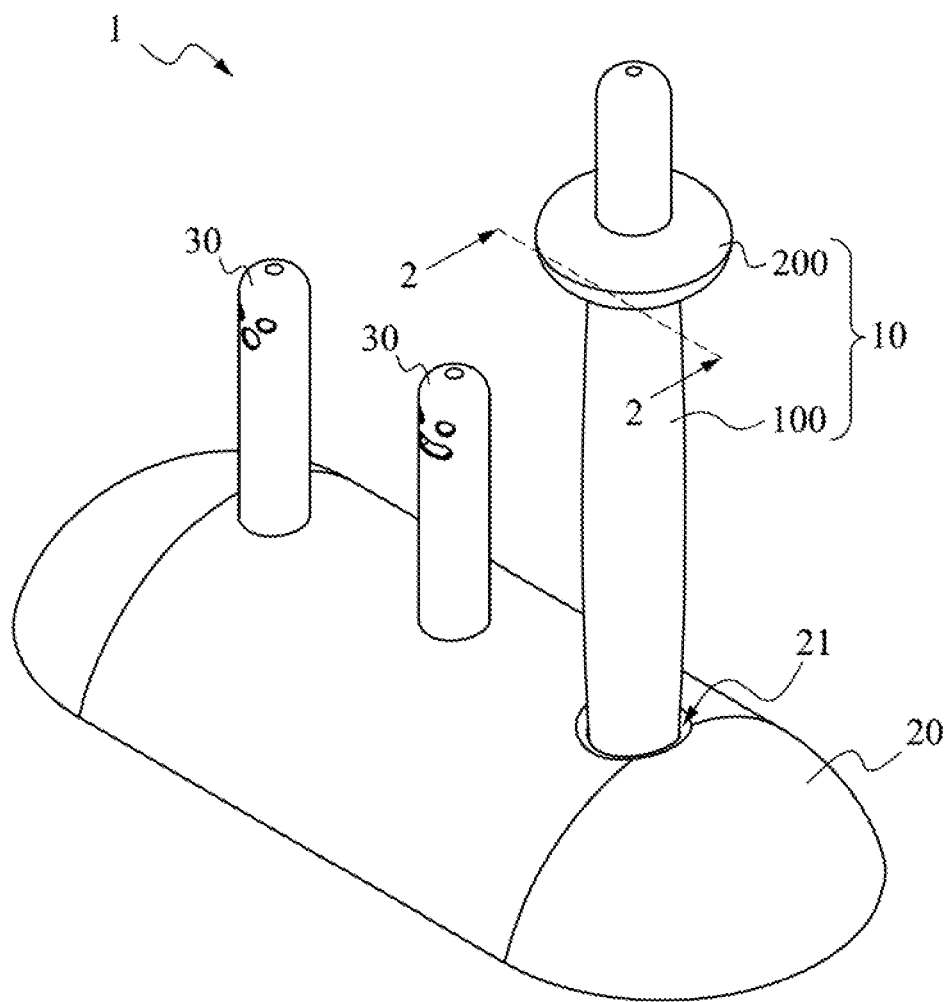
FIG. 1 is a perspective view of a display device control kit in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
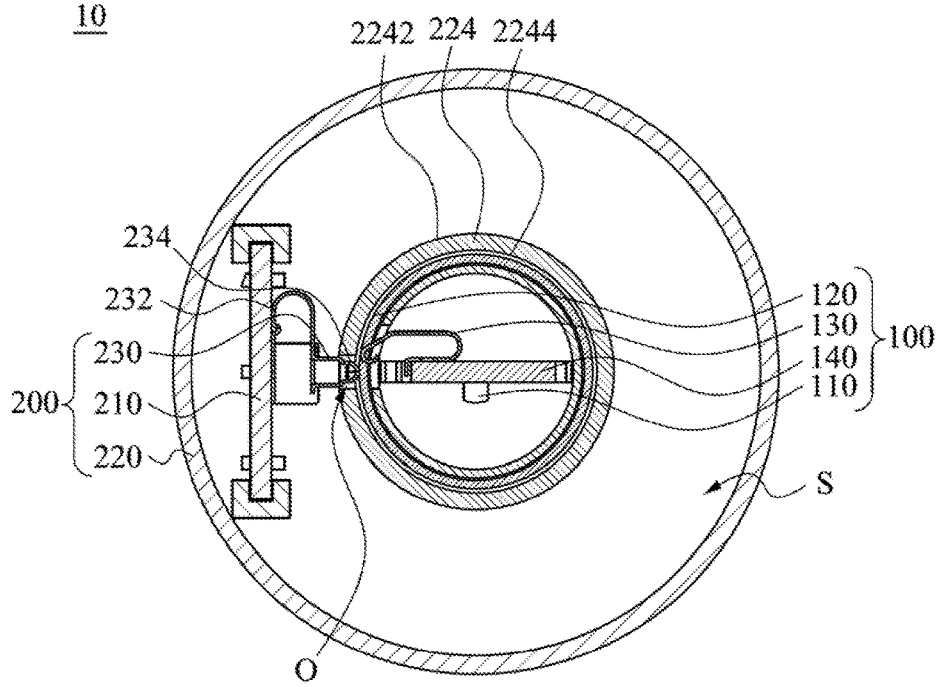
FIG. 2 is a cross-sectional view of the display device control pen taken along line 2-2 in FIG. 1.
Figure 3:
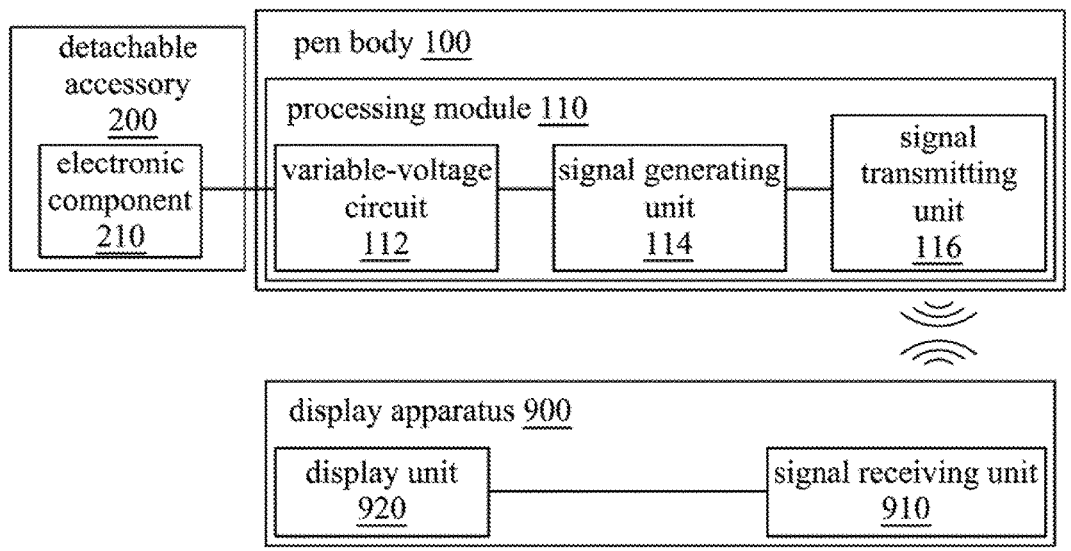
FIG. 3 is a block diagram of a processing module and the display device in accordance with one embodiment of the present disclosure.

FIG. 1 is a perspective view of a display device control kit 1 in accordance with one embodiment of the present disclosure. As shown in FIG. 1, the display device control kit 1 comprises a display device control pen 10, a penholder 20 and at least one accessory securing structure 30. The display device control pen 10 comprises a pen body 100 and at least one detachable accessory 200. The detachable accessory 200 is detachably assembled to the pen body 100. FIG. 2 is a cross-sectional view of the display device control pen 10 taken along line 2-2 in FIG. 1. FIG. 3 is a block diagram of a processing module 110 and a display device 900 in accordance with one embodiment of the present disclosure. As shown in FIG. 2 and FIG. 3, the detachable accessory 200 comprises an electronic component 210, and the pen body 100 comprises a processing module 110. The processing module 110 comprises a variable-voltage circuit 112, a signal generating unit 114 and a signal transmitter 116. The signal generating unit 114 is coupled to the variable-voltage circuit 112, and the signal transmitter 116 is coupled to the signal generating unit 114. When the detachable accessory 200 is assembled to the pen body 100, the electronic component 210 of the detachable accessory 200 is electrically connected to the variable-voltage circuit 112 of the processing module 110 and varies a voltage value of the variable-voltage circuit 112. The signal generating unit 114 can generate a color signal based on the varied voltage value. The signal transmitter 116 transmits the color signal to the display device 900, such that the display device 900 is enabled to display a color on a trace formed by the pen body 100 according to the color signal. In other words, the color corresponding to the color signal is displayed on the trace formed by the pen body 100 on the screen of the display device 900. For example, when the pen body 100 travels along a straight path on the display device 900, a straight line pattern having the color corresponding to the color signal is displayed on the screen of the display device 900.

In some embodiments, the signal generating unit 114 comprises a color lookup table. The color lookup table comprises a plurality of colors to which a plurality of the voltage values correspond. In particular, the color lookup table defines different colors based on different voltage value ranges. For example, in some embodiments, the quantities of the at least one detachable accessory 200 are a plurality of the detachable accessories 200, and the quantities of the at least one variable-voltage circuit are a plurality of the variable-voltage circuits. A plurality of the electronic components 210 of a plurality of the detachable accessories 200 respectively have different impedance values, the variable-voltage circuit 112 generate different varied voltage values when the electronic components 210 of different detachable accessories 200 are electrically connected to the variable-voltage circuit 112 because of the different impedance values, and the different varied voltage values correspond to different colors. The user can choose any one of the detachable accessories 200 to assemble to the pen body 100, such that the variable-voltage circuit 112 can electrically connect to the electronic component 210 of the detachable accessory 200, thereby varying the voltage value of the variable-voltage circuit 112. The signal generating unit 114 can map the varied voltage value to the color lookup table, determine the voltage value range to which the varied voltage value corresponds, and determine the color to which the determined voltage value range corresponds, so as to generate the color signal of the color. The signal transmitter 116 is configured to transmit the color signal to the display device 900, such that the display device 900 is enabled to display a color on a trace formed by the pen body 100 on the display device 900 according to the color signal.

For example, an electronic component 210 of a first detachable accessory 200 is electrically connected to the variable-voltage circuit 112, so that a first voltage value is generated and is mapped to the color lookup table. The signal generating unit 114 determines that the first voltage value falls within a voltage value range that represents red, and therefore, the signal generating unit 114 generates a red color signal and transmits the red color signal to the display device 900 via the signal transmitter 116. The display device 900 can display red on the trace formed by the pen body 100 on the display device 900 according to the red color signal.

An electronic component 210 of a second detachable accessory 200 has an impedance value different from that of the electronic component 210 of the first detachable accessory 200. The electronic component 210 of the second detachable accessory 200 is electrically connected to the variable-voltage circuit 112, so that a second voltage value is generated and is mapped to the color lookup table. The signal generating unit 114 determines that the second voltage value falls within a voltage value range that represents green, and therefore, the signal generating unit 114 generates a green color signal and transmits the green color signal to the display device 900 via the signal transmitter 116. The display device 900 can display green on the trace formed by the pen body 100 on the display device 900 according to the green color signal. An electronic component 210 of a third detachable accessory 200 has an impedance value different from that of the electronic components 210 of the first and second detachable accessories 200. The electronic component 210 of the third detachable accessory 200 is electrically connected to the variable-voltage circuit 112, so that a third voltage value is generated and is mapped to the color lookup table. The signal generating unit 114 determines that the third voltage value falls within a voltage value range that represents blue, and therefore, the signal generating unit 114 generates a blue color signal and transmits the blue color signal to the display device 900 via the signal transmitter 116. The display device 900 can display blue on the trace formed by the pen body 100 on the display device 900 according to the blue color signal. Therefore, when the user desires to see a particular color, the user can choose the detachable accessory 200 corresponding to the particular color and can assemble this detachable accessory 200 to the pen body 100. In other words, the color on the trace formed by the pen body 100 on the display device 900 can be determined by the electronic components 210 of different detachable accessories 200, so as to improve interaction between the user and the display device 900. In some embodiments, the processing module 110 can be implemented by MCU (Micro Control Unit) or CPU (Central Processing Unit), and the signal generating unit 114 can be implemented by hardware, software or firmware in the processing module 110 of the pen body 100.

In some embodiments, the variable-voltage circuit 112 may include an analog-to-digital converter (ADC) that is capable of converting an analog voltage value to a digital voltage value, thereby benefiting the signal generating unit 114 to map the varied voltage value to the color lookup table and determine the colors to which the varied voltage values correspond. As shown in FIG. 3, the display device 900 comprises a signal receiving unit 910 and a display unit 920. The signal receiving unit 910 is coupled to the signal transmitter 116, so that the signal transmitter 116 can transmit the color signal to signal receiving unit 910. For example, the signal transmitter 116 and the signal receiving unit 910 may be wireless transmission units that employ the same wireless communication protocol. For example, both the signal transmitter 116 and signal receiving unit 910 can be, but are not limited to, Bluetooth transmission units or Wi-Fi transmission units. Therefore, the signal transmitter 116 and the signal receiving unit 910 can transfer signals in a wireless manner, so that the signal transmitter 116 can transmit the color signal generated from the signal generating unit 114 to the signal receiving unit 910. The display unit 920 is coupled to the signal receiving unit 910, so that the display unit 920 can display the color on the trace formed by the pen body 100 on the display device 900 according to the color signal received via the signal receiving unit 910. In some embodiments, the display unit 920 may be a liquid crystal display (LCD) panel, a touch display panel or other display panel.

Figure 5:
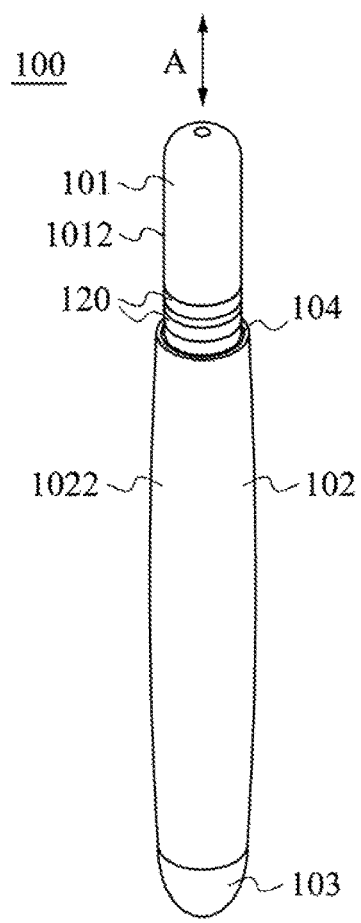
FIG. 5 is a perspective view of the pen body shown in FIG. 1.
Figure 6:
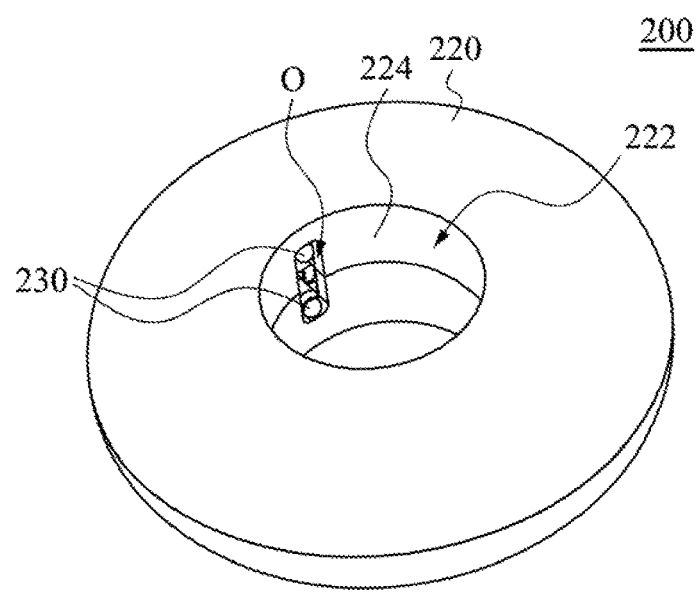
FIG. 6 is a perspective view of the detachable accessory.

In some embodiments, as shown in FIGS. 2, 5 and 6, in which FIG. 5 is a perspective view of the pen body 100, and FIG. 6 is a perspective view of the detachable accessory 200. The pen body 100 comprises at least one electrical connection portion 120. The electrical connection portion 120 is located on an outer surface of the pen body 100 and electrically connected to the variable-voltage circuit 112 of the processing module 110 (See FIG. 3). The detachable accessory 200 further comprises an enclosure 220 and at least one electrical pin portion 230. The detachable accessory 200 has an accommodating space S therein. The electronic component 210 is accommodated in the accommodating space S. The electrical pin portion 230 is electrically connected to the electronic component 210. When the detachable accessory 200 is assembled to the pen body 100, the electrical pin portion 230 is electrically connected to the electrical connection portion 120. As a result, the electronic component 210 can vary the voltage value of the variable-voltage circuit 112. The phrase "electrically connected" in this context not only means that two conductive elements are directed contacted, but also means that an additional conductive element, such as conductive paste or conductive glue, may intervene between two conductive elements.

In some embodiments, as shown in FIGS. 2, 5 and 6, the electrical pin portion 230 is elastic, and the electrical pin portion 230 is compressible by the electrical connection portion 120 when the detachable accessory 200 is assembled to the pen body 100, so that the electrical pin portion 230 can push against the electrical connection portion 120 using an elastic force generated from the compressive deformation of the electrical pin portion 230, thereby benefiting to secure the detachable accessory 200 on the pen body 100. In a greater detail, an end 232 of the electrical pin portion 230 may be a fixed end fixed on the electronic component 210, and another end 234 of the electrical pin portion 230 may be a free end. When the end 234 is pressed by the electrical connection portion 120, the electrical pin portion 230 can be compressed and has elastic potential energy, so that this free end can push against the electrical connection portion 120, so as to secure the detachable accessory 200 and the pen body 100, thereby preventing the detachable accessory 200 from free moving on the pen body 100. In other embodiments, the detachable accessory 200 and the pen body 100 can be assembled in a magnetic attraction manner. For example, the detachable accessory 200 and the pen body 100 both include magnets, so that they can be secured to each other using magnetic attraction forces.

In some embodiments, as shown in FIGS. 2, 3, 5 and 6, the pen body 100 further comprises a connection conductor 130 and a circuit board 140. The processing module 110 is disposed on the circuit board 140. One end of the connection conductor 130 is connected to the circuit board 140 and another end of the connection conductor 130 is connected to the electrical connection portion 120. As such, the connection conductor 130 can electrically connect the electrical connection portion 120 and the variable-voltage circuit 112 of the processing module 110. Therefore, when the electronic component 210 is electrically connected to the electrical connection portion 120 via the electrical pin portion 230, the connection conductor 130 electrically connects the electrical connection portion 120 and the variable-voltage circuit 112 of the processing module 110, so that the electronic component 210 can vary the voltage value of the variable-voltage circuit 112. In some embodiments, the pen body 100 may include a battery module (not shown) therein. For example, a battery may be disposed inside the pen body 100, so as to energize the processing module 110, the electrical connection portion 120 and the connection conductor 130.

In some embodiments, as shown in FIGS. 2, 3 5 and 6, the detachable accessory 200 is an annular object. More particularly, the enclosure 220 of the detachable accessory 200 comprises an inner wall 224. The inner wall 224 is annular. The inner wall 224 has an opening O. The electrical pin portion 230 protrudes from the opening O of the inner wall 224 to electrically connect to the electrical connection portion 120 of the pen body 100. In a greater detail, the inner wall 224 has a first wall surface 2242 and a second wall surface 2244 that are opposite. The opening O passes through the first wall surface 2242 and the second wall surface 2244, such that the opening O can connect the accommodating space S of the enclosure 220 and the inner wall 224. The pen body 100 may include a first pen shaft 101 and a second pen shaft 102. The first pen shaft 101 is axially connected to the second pen shaft 102. The electrical connection portion 120 is located on an outer surface of the first pen shaft 101. When the detachable accessory 200 is assembled to the first pen shaft 101 of the pen body 100, the annular inner wall 224 encircles the first pen shaft 101 of the pen body 100. Therefore, one end 232 of the electrical pin portion 230 can be located in the accommodating space S and electrically connected to the electronic component 210, and another end 234 of the electrical pin portion 230 can go through the opening O and extend beyond the second wall surface 2244 of the inner wall 224, so as to electrically connect to the electrical connection portion 120 that is located outside the second wall surface 2244. Therefore, the electrical pin portion 230 can electrically connect the electronic component 210 in the accommodating space S and the electrical connection portion 120 outside the accommodating space S.

Figure 4:
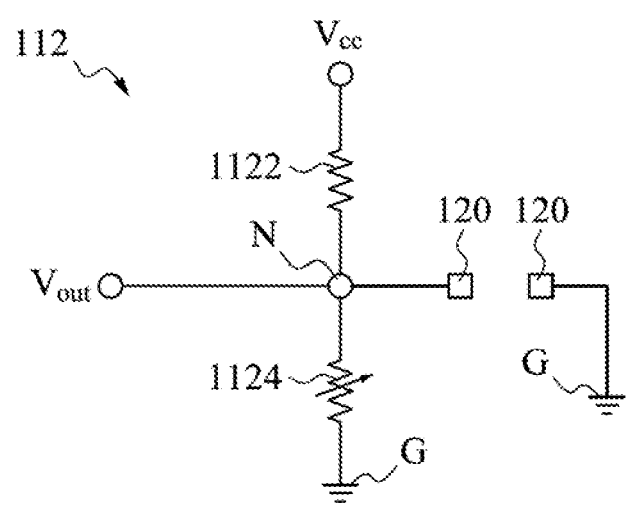
FIG. 4 is a circuit diagram of the variable-voltage circuit in accordance with one embodiment of the present disclosure.

Reference is made to FIGS. 2, 4 and 5, in which FIG. 4 is a circuit diagram of the variable-voltage circuit 112 in accordance with one embodiment of the present disclosure. In this embodiment, there are two electrical pin portions 230 in the detachable accessory 200 and two electrical connection portions 120 in the pen body 100. The variable-voltage circuit 112 may include a first resistor 1122 and a second resistor 1124. The first resistor 1122 and the second resistor 1124 are connected in series connection, so as to form a series circuit. One electrical connection portion 120 is electrically connected between the first resistor 1122 and the second resistor 1124 and forms a node N. When two electrical pin portions 230 are respectively electrically connected to two electrical connection portions 120, the electronic component 210 has an impedance value and thereby varies the voltage value of the node N. Therefore, when different electronic components 210 having unequal impedance values are individually electrically connected to the variable-voltage circuit 112, the voltage value of the node N becomes different. As such, the signal generating unit 114 (See FIG. 3) can generate different color signals based on the different voltage values of the node N, so as to benefit the display device 900 to display different colors on the trace formed by the pen body 100 corresponding to different detachable accessories 200

More particularly, two electrical connection portions 120 are respectively connected to the node N and the ground G. Two ends of the second resistor 1124 are respectively electrically connected to the node N and the ground G. As a result, when two electrical pin portions 230 of the detachable accessory 200 are respectively connected to two electrical connection portions 120, the electronic component 210 of the detachable accessory 200 and the second resistor 1124 forms a parallel circuit to vary the voltage value of the node N.

In some embodiments, the second resistor 1124 can be a variable resistor for controlling the voltage value of the node N to reach a level within a relatively detectable range. In other embodiments, the first resistor 1122 can be a variable resistor as well, and the second resistor 1124 is not a variable resistor. In other embodiments, the first resistor 1122 and the second resistor 1124 can both be variable resistors.

In some embodiments, a color of at least a portion of the enclosure 220 of the detachable accessory 200 is the same as or similar to the color of the color signal that the signal generating unit 114 generates corresponding to the detachable accessory 200. For example, at least a portion of the enclosure 220 of the first detachable accessory 200 is red, and the first detachable accessory 200 can make the display device 900 to display red on the trace formed by the pen body 100 on the display device 900. Therefore, the user can acknowledge the displayed color on the trace formed by the pen body 100 on the display device 900 based on the color of the enclosure 220 of the detachable accessory 200. As a result, when the enclosures 220 of the detachable accessories 200 have colors different from each other, the user can assemble detachable accessory 200 having the desired color to the pen body 100 based on the desired color, so that the desired color can be correspondingly displayed on the trace formed by the pen body 100 on the display device 900.

As shown in FIG. 5, in some embodiments, a diameter of the first pen shaft 101 is less than that of the second pen shaft 102. The detachable accessory 200 encircles the first pen shaft 101, such that the electronic component 210 is electrically connected to the electrical connection portion 120, thereby preventing the detachable accessory 200 from falling down to the second pen shaft 102. In particular, the first pen shaft 101 has a first outer circumferential surface 1012, the second pen shaft 102 has a second outer circumferential surface 1022, and the pen body 100 further has a step surface 104. The step surface 104 connects the first outer circumferential surface 1012 and the second outer circumferential surface 1022. The step surface 104 is substantially perpendicular to the axial direction A of the first pen shaft 101. Therefore, even if the detachable accessory 200 encircling the first pen shaft 101 falls down along the axial direction A of the first pen shaft 101, the detachable accessory 200 may stop falling by the step surface 104, so that the detachable accessory 200 would not keep falling down to the second outer circumferential surface 1022.

In some embodiments, as shown in FIG. 5, the pen body 100 further comprises a touch portion 103. The touch portion 103 is disposed on one end of the second pen shaft 102 opposite to the first pen shaft 101. In other words, the touch portion 103 and the first pen shaft 101 are located on two opposite ends of the second pen shaft 102. The touch portion 103 is configured to touch the display device 900 (See FIG. 1), so as to leave the trace formed by the pen body 100 on the display device 900. In some embodiments, the touch portion 103 has an end for contacting with the display device 900, and this end of the touch portion 103 may have a smooth surface, so as to prevent from damaging the display device 900. In some embodiments, a material of the touch portion 103 may be, but is not limited to, rubber or conductive fabric, which may prevent from damaging the display device 900.

Figure 7:
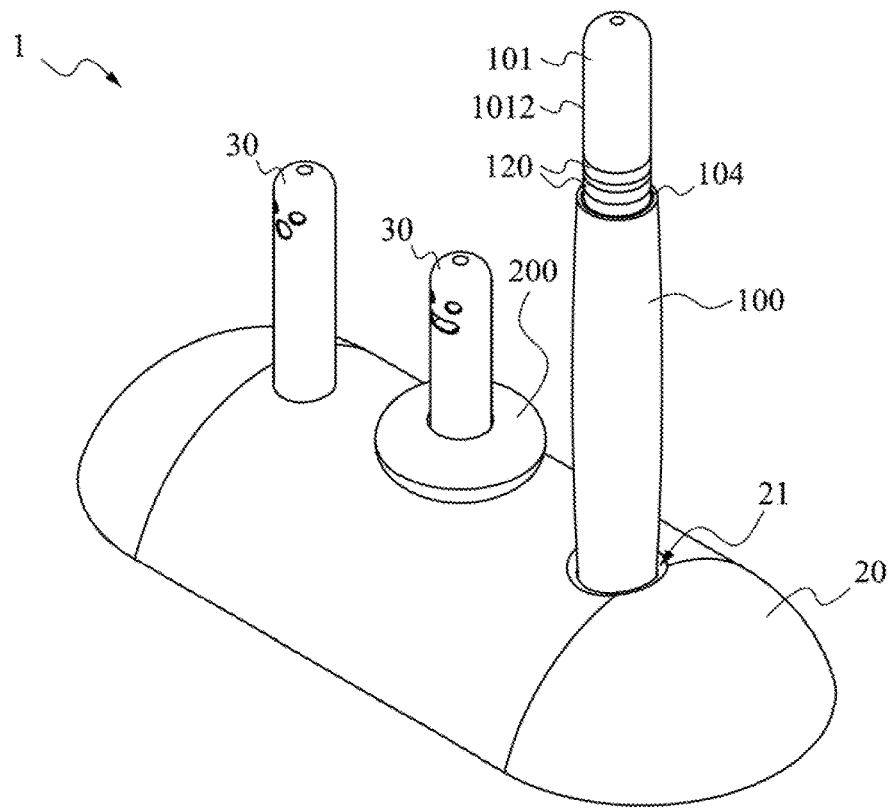
FIG. 7 is a perspective view of the display device control kit shown in FIG. 1 in accordance with one embodiment of the present disclosure.

In some embodiments, as shown in FIG. 1, the penholder 20 of the display device control kit 1 has a pen body accommodating recess 21. The display device control pen 10 is pluggably accommodated in the pen body accommodating recess 21. For example, the touch portion 103 and a portion of the second pen shaft 102 of the pen body 100 can be accommodated in the pen body accommodating recess 21. The accessory securing structure 30 is located on the penholder 20 and can be configured to secure the detachable accessory 200 when the detachable accessory 200 is detached from the pen body 100, as shown in FIG. 7. In some embodiments, the accessory securing structure 30 is a stick-shaped object, as shown in FIGS. 1, 6 and 7. The detachable accessory 200 can encircle the pen body 100 or the accessory securing structure 30 by the hole 222.

Figure 8:
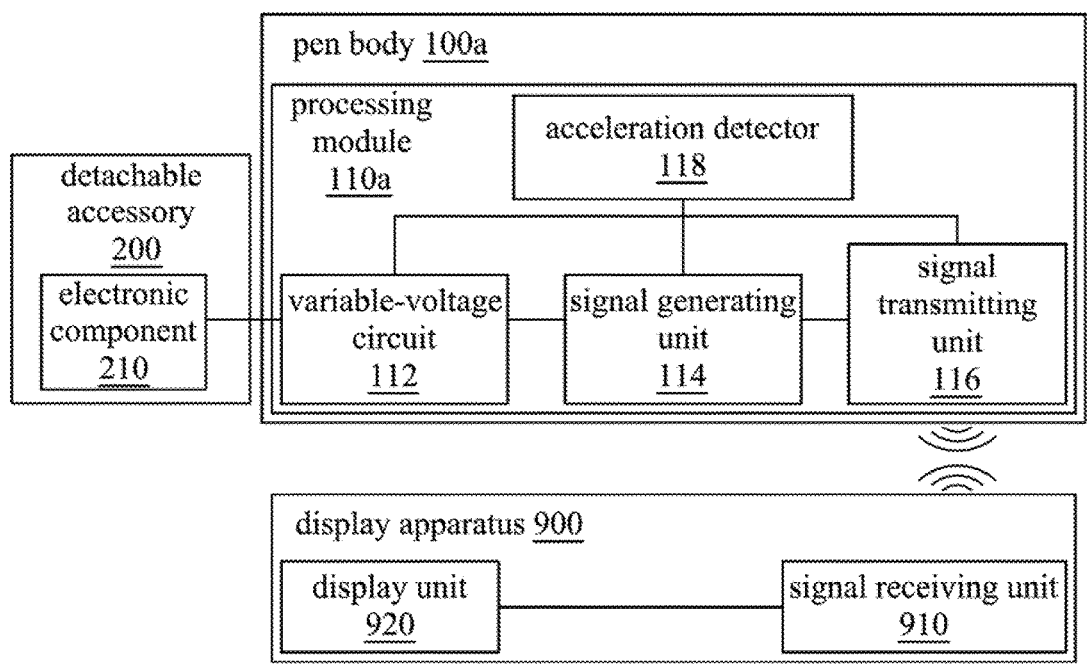
FIG. 8 is a block diagram of a processing module and the display device in accordance with another embodiment of the present disclosure.

FIG. 8 is a block diagram of a processing module 110a and the display device 900 in accordance with another embodiment of the present disclosure. As shown in FIG. 8, the display device control kit 1 comprises the display device control pen 10, the penholder 20 and at least one accessory securing structure 30 the same as that of the aforementioned embodiments, and the identical features are therefore not described repeatedly. Difference between the embodiment in FIG. 8 and that in FIG. 3 is described as follows. In the embodiment in FIG. 8, the processing module 110a of the pen body 100a may further include an acceleration sensor 118. The acceleration sensor 118 is coupled to the variable-voltage circuit 112, the signal generating unit 114 and the signal transmitter 116. The acceleration sensor 118 is configured to detect a movement of the pen body 100a and to output an activating signal to activate the variable-voltage circuit 112, the signal generating unit 114 and the signal transmitter 116 when the movement of the pen body 100a is detected.

Figure 9:
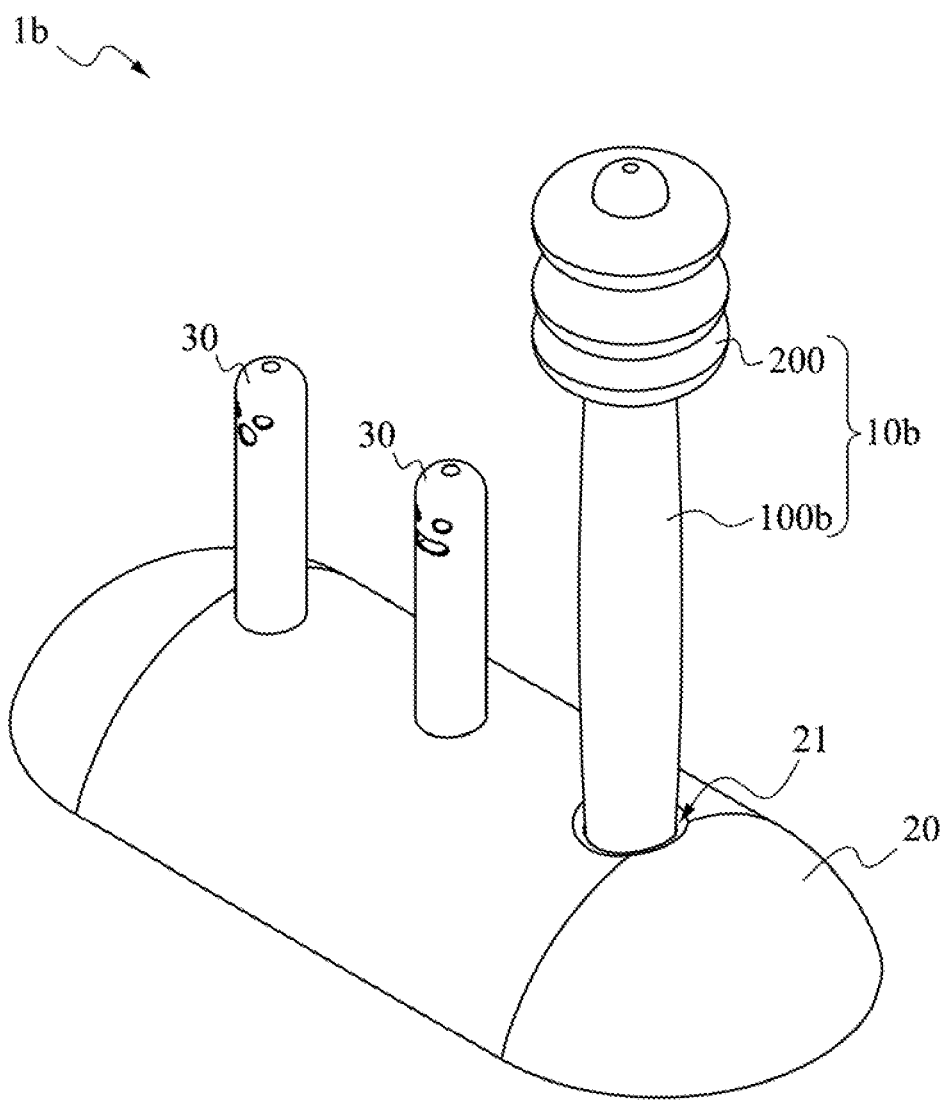
FIG. 9 is a perspective view of a display device control kit in accordance with another embodiment of the present disclosure.
Figure 10:
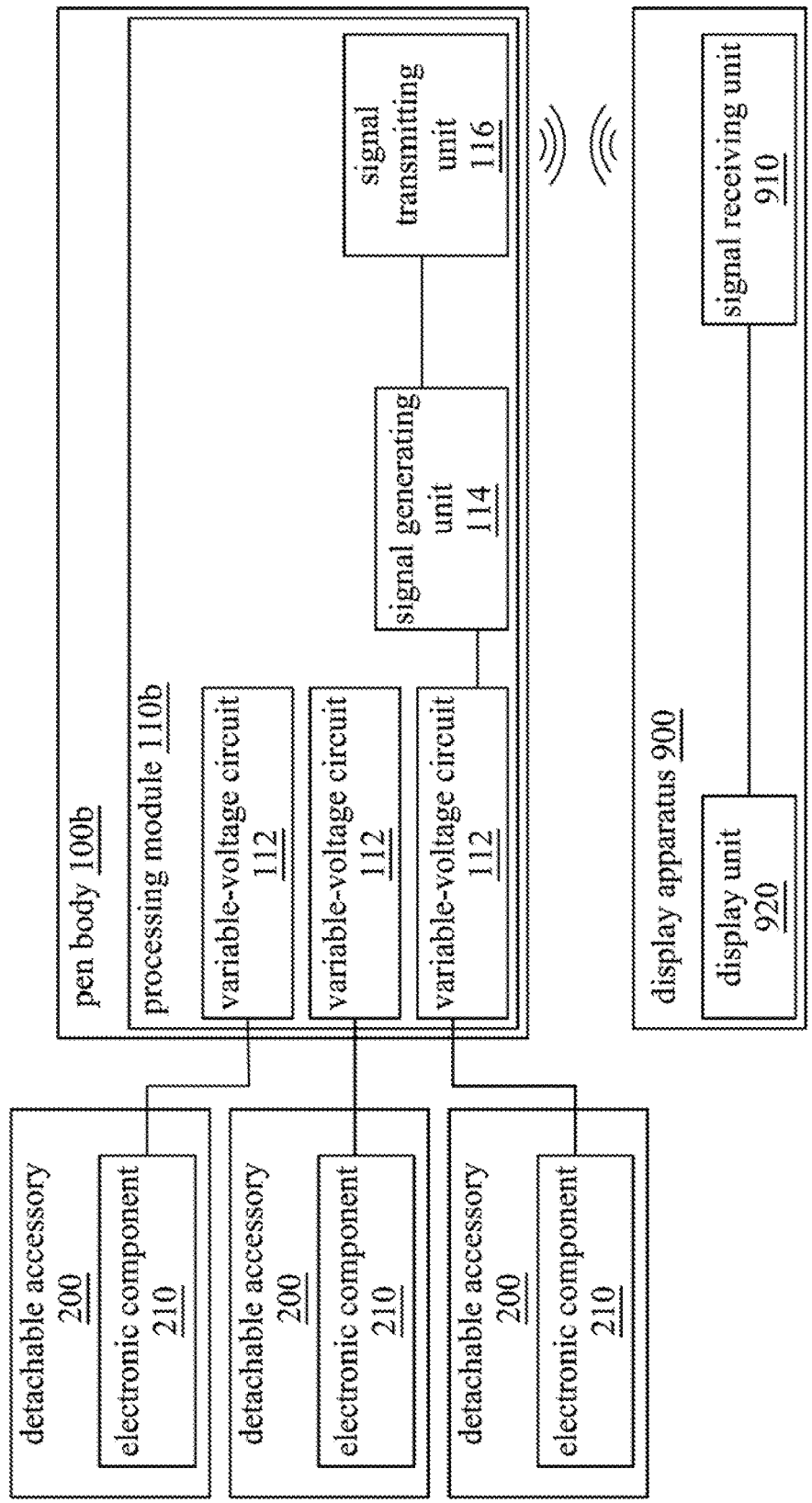
FIG. 10 is a block diagram of a processing module and the display device in accordance with another embodiment of the present disclosure.

FIG. 9 is a perspective view of a display device control kit 1b in accordance with another embodiment of the present disclosure. FIG. 10 is a block diagram of a processing module 110b and the display device 900 in accordance with another embodiment of the present disclosure. As shown in FIGS. 9 and 10, the display device control kit 1b comprises the display device control pen 10, the penholder 20 and at least one accessory securing structure 30 the same as that of the aforementioned embodiments, and the identical features are therefore not described repeatedly. Difference between the embodiment in FIGS. 9, 10 and that in FIGS. 1, 3 is described as follows. A plurality of detachable accessories 200 are included in this embodiment, and a plurality of variable-voltage circuits 112 are included in the processing module 110b of the pen body 100b. Ends of the variable-voltage circuits 112 are electrically connected to the signal generating unit 114. When the detachable accessories 200 are assembled to the pen body 100b, another ends of the variable-voltage circuits 112 are respectively electrically connected to the electronic components 210 of the detachable accessories 200, as shown in FIG. 10.

Figure 11:
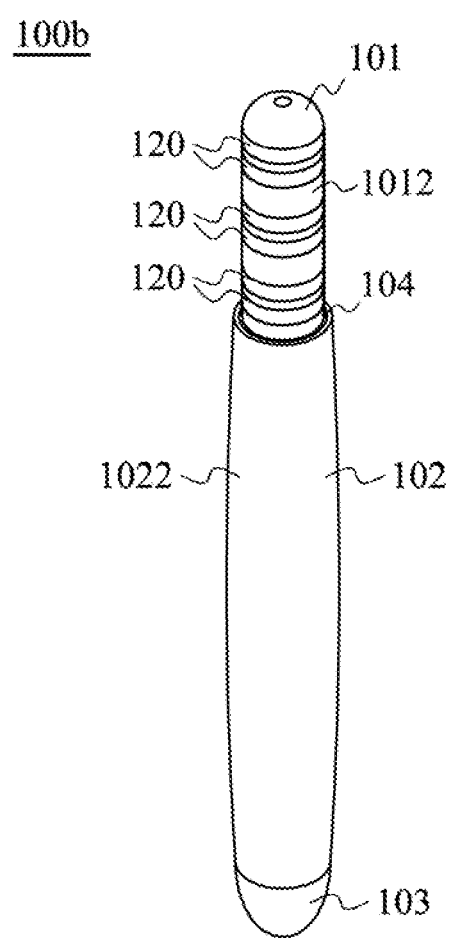
FIG. 11 is a perspective view of the pen body shown in FIG. 9.

As mentioned above, FIG. 11 is a perspective view of the pen body 100b shown in FIG. 9. As shown in FIG. 11, the pen body 100b comprises six electrical connection portions 120. The six electrical connection portions 120 are all located on the first pen shaft 101. Every two electrical connection portions 120 are electrically connected to two electrical pin portions 230 of a detachable accessory 200, and every two electrical connection portions 120 are electrically connected to one variable-voltage circuit 112 of the processing module 110, as shown in FIGS. 2 and 6. Since the pen body 100b comprises six electrical connection portions 120, three detachable accessories 200 can encircle the first pen shaft 101 of the pen body 100b simultaneously. It is understood that numbers of the detachable accessories 200 and the electrical connection portions 120 are exemplary, not limiting the present disclosure.

The signal generating unit 114 of the processing module 110b comprises a color lookup table and a color mixing lookup table. The color lookup table comprises a plurality of colors to which a plurality of voltage values correspond, and the color mixing lookup table comprises a plurality of mixed colors to which a plurality of color combinations correspond. More particularly, the color lookup table defines different colors based on different voltage value ranges, and the color mixing lookup table defines different mixed colors based on different color combinations. Since the electronic components 210 have different impedance values, when the detachable accessories 200 are assembled to the pen body 100b, the electronic components 210 of the detachable accessories 200 can respectively be electrically connected to variable-voltage circuits 112 and can vary the voltage value of each variable-voltage circuit 112. The signal generating unit 114 can store the varied voltage values of the variable-voltage circuits 112. The signal generating unit 114 can map the varied voltage values of the variable-voltage circuits 112 to the color lookup table. The signal generating unit 114 can determine the voltage value ranges to which the varied voltage values correspond. The signal generating unit 114 can determine the colors to which the voltage value ranges correspond. The signal generating unit 114 can map the determined colors to the color mixing lookup table and can determine the mixed color to which the combination of the determined colors corresponds, so as to generate the color signal.

For example, when three detachable accessories 200 are assembled to the pen body 100b, three electronic components 210 are respectively electrically connected to three variable-voltage circuits 112 and vary the voltage value of each variable-voltage circuit 112, and the signal generating unit 114 can store the varied voltage values of the variable-voltage circuits 112, map the three varied voltage values to the color lookup table, and determine three colors to which the three varied voltage values correspond. For example, the three varied voltage values respectively correspond to red, orange and green. The signal generating unit 114 can further map the three determined colors to the color mixing lookup table and can determine the mixed color, such as brown, to which the combination of the three determined colors correspond. The signal generating unit 114 can therefore generate the color signal based on the determined mixed color. For example, if the mixed color of red, orange and green is brown, the signal generating unit 114 can generate the brown color signal. The signal transmitter 116 can transmit the color signal generated from the signal generating unit 114 to the display device 900, so that the display device 900 can display the color on the trace formed by the pen body 100b on the display device 900 according to the color signal. For example, the display device 900 can display the brown on the trace formed by the pen body 100b on the display device 900 according to the brown color signal. More particularly, the signal transmitter 116 can transmit the color signal generated from the signal generating unit 114 to the signal receiving unit 910 of the display device 900, and the signal receiving unit 910 can transmit the color signal to the display unit 920, so that the display unit 920 can display the corresponding color on the trace formed by the pen body 100b on the display device 900 according to the color signal. Therefore, the user can assemble plural detachable accessories 200 to the pen body 100b based on the desired mixed color, so that the desired mixed color can be correspondingly displayed. In other words, the color on the trace formed by the pen body 100b on the display device 900 can determined by assembling plural detachable accessories 200 to the pen body 100b, so as to improve interaction between the user and the display device 900.

In some embodiments, when plural detachable accessories 200 are assembled to the pen body 100b, the electronic components 210 of the detachable accessories 200 can be respectively electrically connected to the variable-voltage circuits 112 and can vary the voltage value of each variable-voltage circuit 112. The signal generating unit 114 can store the varied voltage value of each variable-voltage circuit 112, map selectively one of the varied voltage values to the color lookup table, and determine the color to which the selected varied voltage value corresponds, so as to generate the color signal. In other words, when plural detachable accessories 200 are assembled to the pen body 100b, the signal generating unit 114 can map selectively one of the varied voltage values to the color lookup table, determine a monochrome color to which the selected varied voltage value corresponds, so as to generate a monochrome color signal. Selectively, the signal generating unit 114 can map the varied voltage values to the color lookup table, determine the colors to which the varied voltage values correspond, map the determined colors to the color mixing lookup table, determine the mixed color to which the combination of the determined colors corresponds, and generate a mixed color signal. Thereafter, the signal transmitter 116 can transmit the monochrome color signal or the mixed color signal generated from the signal generating unit 114 to the display device 900, so that the display device 900 can display the corresponding monochrome color or mixed color on the trace formed by the pen body 100b on the display device 900 according the monochrome color signal or the mixed color signal.

For example, when three detachable accessories 200 are assembled to the pen body 100b, and three electronic components 210 are respectively electrically connected to three variable-voltage circuits 112 and vary the voltage value of each variable-voltage circuit 112, the signal generating unit 114 can store the varied voltage value of each variable-voltage circuit 112, map selectively one of the three varied voltage values to the color lookup table, and determine the monochrome color to which the selected varied voltage value corresponds, so as to generate the monochrome color signal. The signal transmitter 116 can transmit the monochrome color signal generated from the signal generating unit 114 to the display device 900, so that the display device 900 can display the monochrome color on the trace formed by the pen body 100b on the display device 900 according to the monochrome color signal.

Figure 12:
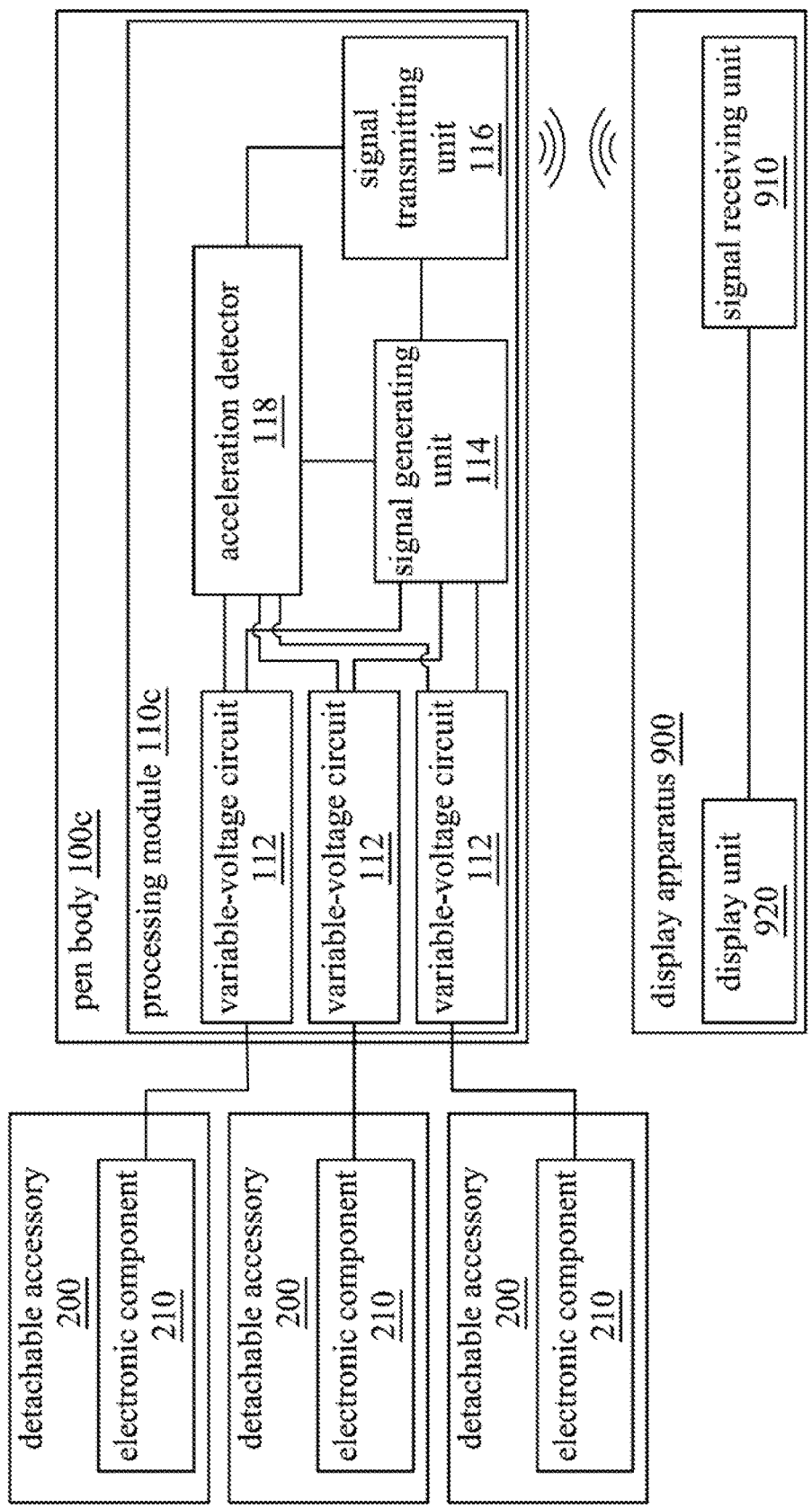
FIG. 12 is a block diagram of a processing module and the display device in accordance with another embodiment of the present disclosure.

FIG. 12 is a block diagram of a processing module 110c and the display device 900 in accordance with another embodiment of the present disclosure. As shown in FIG. 12, the display device control kit (not shown in this figure) comprises the display device control pen 10, the penholder 20 and at least one accessory securing structure 30 the same as that of the aforementioned embodiments, and the identical features are therefore not described repeatedly. Difference between the embodiment in FIGS. 12 and 13 and that in FIG. 10 is described as follows. The processing module 110c in this embodiment may further include an acceleration sensor 118. The acceleration sensor 118 is configured to detect a movement of the pen body 100c and to output an activating signal to activate the variable-voltage circuit 112, the signal generating unit 114 and the signal transmitter 116 when the movement of the pen body 100c is detected. After the acceleration sensor 118 outputs the activating signal, the acceleration sensor 118 keeps detecting the movement of the pen body 100c to output a color switching signal. The signal generating unit 114 receives the color switching signal and is adapt to generate one of the monochrome and mixed color signals according to a predetermined mapping sequence and transmits the generated color signal to the signal transmitter 116.

For example, when three detachable accessories 200 are assembled to the pen body 100c such that three electronic components 210 are respectively electrically connected to three variable-voltage circuits 112, the signal generating unit 114 acknowledges that there are three detachable accessories 200 encircling the pen body 100c, the three variable-voltage circuits 112 can respectively output a first voltage value, a second voltage value and a third voltage value. The signal generating unit 114 receives and stores the first voltage value, the second voltage value and the third voltage value. The signal generating unit 114 maps the first voltage value, the second voltage value and the third voltage value to the color lookup table. The signal generating unit 114 determines three colors, such as red, orange and green, to which the first voltage value, the second voltage value and the third voltage value correspond. The signal generating unit 114 maps the three colors to the color mixing lookup table. The signal generating unit 114 determines the mixed color, such as brown, to which the combination of the three colors corresponds. The signal generating unit 114 generates the mixed color signal based on the determined mixed color and transmits the mixed color signal to the signal transmitter 116. Thereafter, when the acceleration sensor 118 detects the movement of the pen body 100c and outputs a color switching signal, the signal generating unit 114 receives the color switching signal and is adapt to generate one of the monochrome and mixed color signals according to a predetermined mapping sequence and transmits the generated color signal to the signal transmitter 116. For example, the predetermined mapping sequence is determined as follows. After the foregoing mixed color signal is outputted, when the signal generating unit 114 receives the color switching signal, the signal generating unit 114 reads the first voltage value, maps the first voltage value to the color lookup table, determines a first monochrome color, such as red, to which the first voltage value corresponds, and generates the first monochrome color signal. Afterwards, when the acceleration sensor 118 detects the movement of the pen body 100c and outputs a color switching signal again, the signal generating unit 114 receives the color switching signal, and the predetermined mapping sequence is determined as follows. After the first monochrome color signal is outputted, when the signal generating unit 114 receives the color switching signal, the signal generating unit 114 reads the second voltage value, maps the second voltage value to the color lookup table, determines a second monochrome color, such as orange, to which the second voltage value corresponds, and generates the second monochrome color signal. Thereafter, when the acceleration sensor 118 detects the movement of the pen body 100c and outputs a color switching signal again, the signal generating unit 114 receives the color switching signal, and the predetermined mapping sequence is determined as follows. After the second monochrome color signal is outputted, when the signal generating unit 114 receives the color switching signal, the signal generating unit 114 reads the third voltage value, maps the third voltage value to the color lookup table, determines a third monochrome color, such as green, to which the third voltage value corresponds, and generates the third monochrome color signal. Then, when the acceleration sensor 118 detects the movement of the pen body 100c and outputs a color switching signal again, the signal generating unit 114 receives the color switching signal, and the predetermined mapping sequence is determined as follows. After the third monochrome color signal is outputted, when the signal generating unit 114 receives the color switching signal, the signal generating unit 114 reads the first, second and third voltage values and generates the mixed color signal according to the aforementioned mixed color determining process.

In other words, the color switching signal can be outputted based on the detecting result from the acceleration sensor 118, such as whether the pen body is shaken or moved. This color switching signal can control the signal generating unit 114 to change the outputted color signal.

Figure 13:
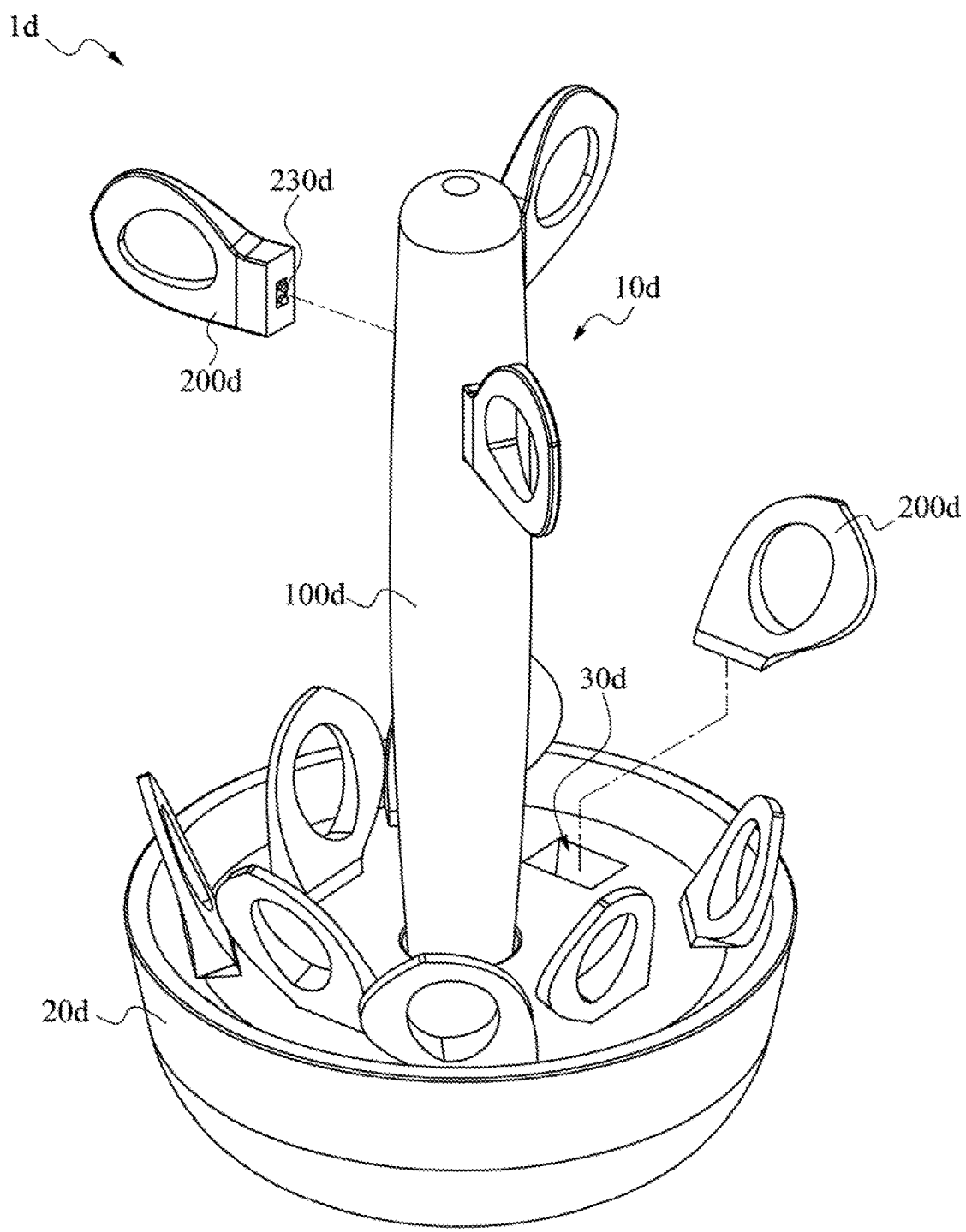
FIG. 13 is a perspective view of a display device control kit in accordance with another embodiment of the present disclosure.

FIG. 13 is a perspective view of a display device control kit 1d in accordance with another embodiment of the present disclosure. The elements of the display device control kit 1d the same as that of the display device control kit 1 in FIG. 7 and the display device control kit 1b in FIG. 9 are not described repeatedly. Difference between the display device control kit 1d and that in FIGS. 7 and 9 is described as follows. The display device control pen 10d has an appearance different from that of the display device control pens 10 and 10b. More particularly, the detachable accessory 200d of the display device control pen 10d is a pull ring structure. Moreover, the detachable accessory 200d and the pen body 100d are assembled in a pluggable manner. For example, the detachable accessory 200d can insert into a socket on the pen body 100d and be assembled to the pen body 100d. Moreover, the electrical pin portion 230d of the detachable accessory 200d can be electrically connected to the electrical connection portion (not shown) in the socket of the pen body 100d, so as to vary the voltage value of the variable-voltage circuit. The accessory securing structure 30d is a recess recessed on the penholder 20d, such that the detachable accessory 200d can insert into the accessory securing structure 30d after the detachable accessory 200d is detached from the pen body 100d.

Figure 14:
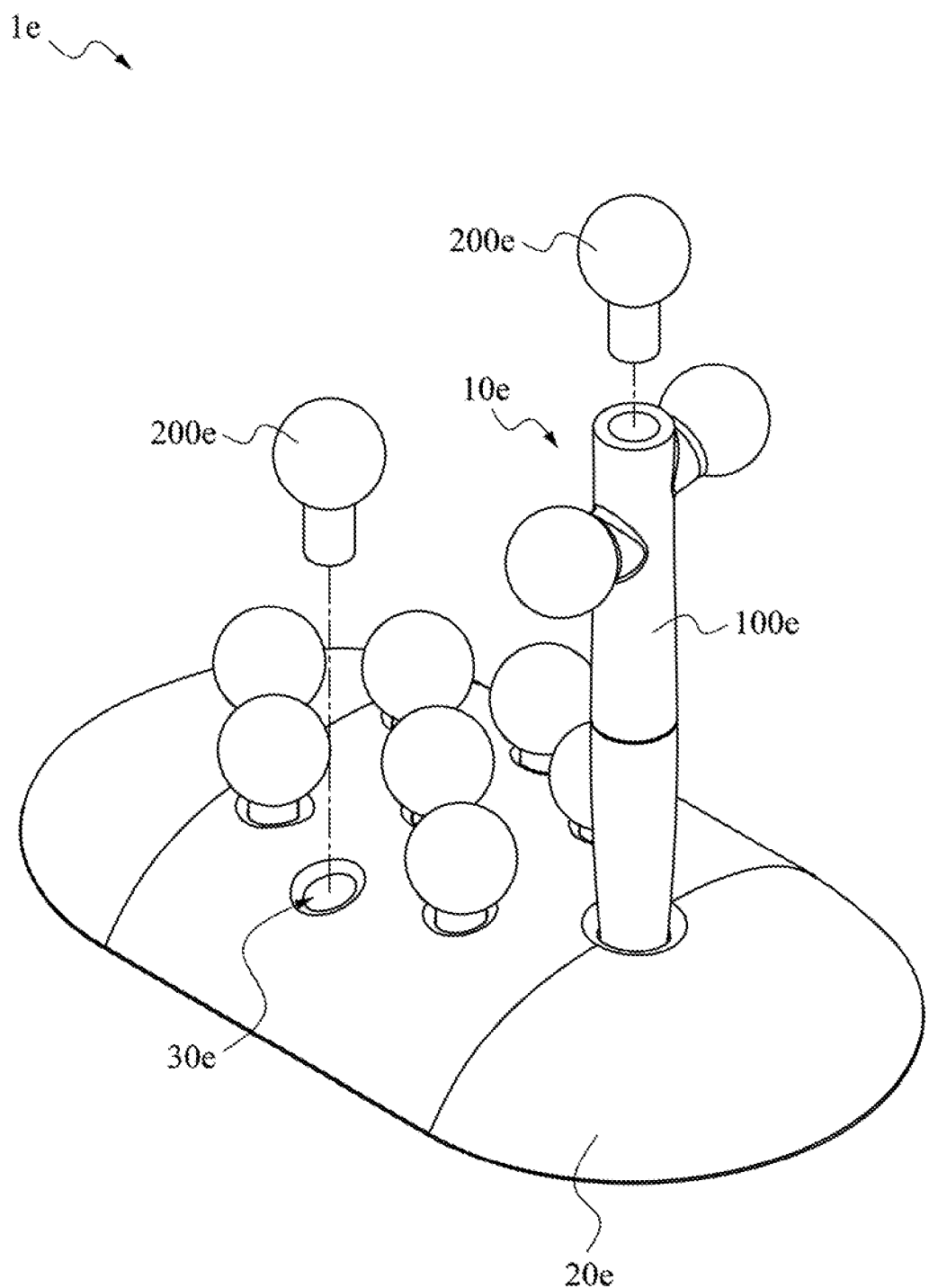
FIG. 14 is a perspective view of a display device control kit in accordance with another embodiment of the present disclosure.

FIG. 14 is a perspective view of a display device control kit 1e in accordance with another embodiment of the present disclosure. The elements of the display device control kit 1e the same as that of the display device control kit 1 in FIG. 7, the display device control kit 1b in FIG. 9 and the display device control kit 1d in FIG. 13 are not described repeatedly. Difference between the display device control kit 1e and that in FIGS. 7, 9 and 13 is described as follows. The display device control pen 10e has an appearance different from that of the display device control pens 10, 10b and 10d. More particularly, the detachable accessory 200e of the display device control pen 10e is a mushroom-shaped structure or a bulb-shaped structure. Moreover, the detachable accessory 200e and the pen body 100e are assembled in a pluggable manner. The accessory securing structure 30e is a recess recessed on the penholder 20e, such that the detachable accessory 200e can insert into the accessory securing structure 30e after the detachable accessory 200e is detached from the pen body 100e.

Figure 15:
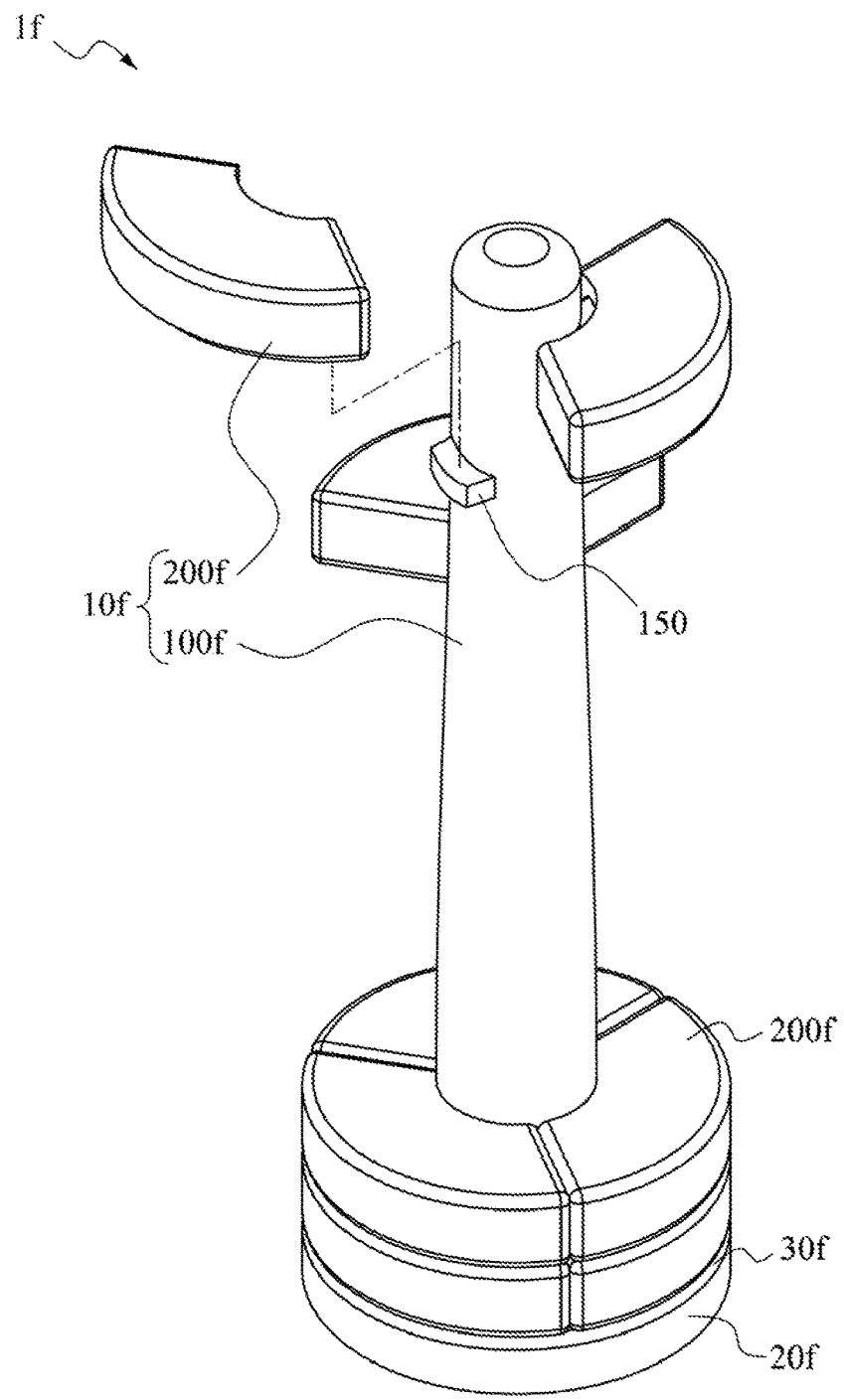
FIG. 15 is a perspective view of a display device control kit in accordance with another embodiment of the present disclosure.

FIG. 15 is a perspective view of a display device control kit 1f in accordance with another embodiment of the present disclosure. The elements of the display device control kit 1f the same as that of the display device control kit 1 in FIG. 7, the display device control kit 1b in FIG. 9, the display device control kit 1d in FIG. 13 and the display device control kit 1e in FIG. 14 are not described repeatedly. Difference between the display device control kit 1f and that in FIGS. 7, 9, 13 and 14 is described as follows. The display device control pen 10f has an appearance different from that of the display device control pens 10, 10b, 10d and 10e. More particularly, the detachable accessory 200f of the display device control pen 10f is a circular sector plate of 120 degrees. Moreover, the detachable accessory 200f and the pen body 100f are assembled in a fastening manner. For example, a fitting part 150 on the pen body 100f can mechanically fits to the fitting recess (not shown) of the detachable accessory 200f. Moreover, the detachable accessory 200f may be magnetic, and the accessory securing structure 30f may be a magnet, such that the detachable accessory 200f can be secured on the penholder 20f by magnetically attracted with the accessory securing structure 30f after the detachable accessory 200f is detached from the pen body 100f. In other embodiments, the fitting part 150 of the pen body 100f may include a magnet as well, so that the detachable accessory 200f can be magnetically attracted on the pen body 100f.

Figure 16:
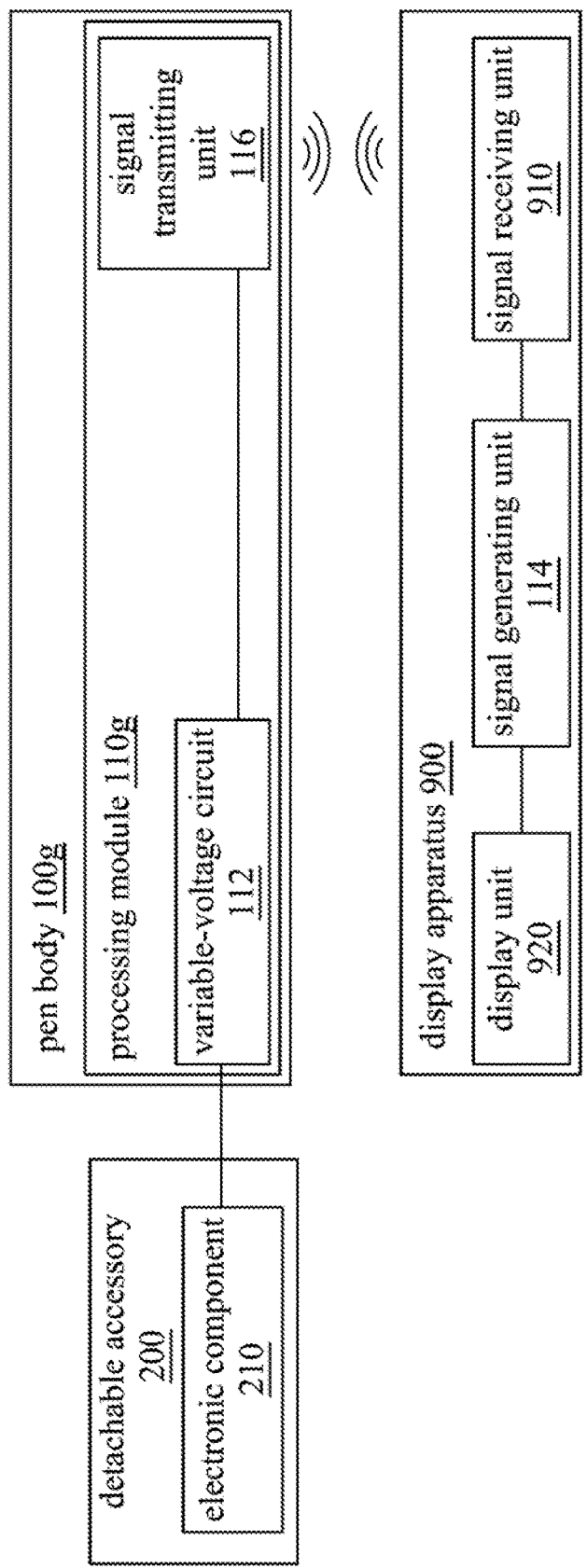
FIG. 16 is a block diagram of a display device control module in accordance with one embodiment of the present disclosure.

FIG. 16 is a block diagram of a display device control module in accordance with one embodiment of the present disclosure. As shown in FIG. 16, the display device control module may include a display device control pen and a display device 900g, in which structures, elements and corresponding features of the display device control pen can be referred to the foregoing display device control pen 10, 10d, 10e and 10f. For example, the display device control pen may include the foregoing detachable accessory 200, and the variable-voltage circuit 112 may include an analog-to-digital converter (ADC), and the circuit diagram thereof is the same as which is shown in FIG. 4. The pen body 100g comprises the first pen shaft, the second pen shaft and the touch portion as well, and arrangement of these elements can be referred to FIGS. 2, 5 and 6 and the foregoing related context, and the identical features are therefore not described repeatedly. Difference between the embodiment in FIG. 16 and that in FIG. 3 is described as follows. The pen body 100g of the display device control pen and the detachable accessory 200 are detachably assembled. The main difference between the pen body 100g and the pen body 100 as shown in FIG. 3 is that a signal generating unit 930 is disposed on the display device 900g, and therefore, the display device 900g comprises the signal receiving unit 910, the display unit 920 and the signal generating unit 930, and the processing module 110g of the pen body 100g comprises the variable-voltage circuit 112 and the signal transmitter 116, but it does not include the signal generating unit. In other words, the pen body 100g does not generate the color signal and does not transmit the color signal to the display device 900g. The signal transmitter 116 is coupled to the variable-voltage circuit 112. When the detachable accessory 200 is assembled to the pen body 100g, the electronic component 210 of the detachable accessory 200 is electrically connected to the variable-voltage circuit 112 and varies a voltage value of the variable-voltage circuit 112. The signal transmitter 116 is coupled to the signal receiving unit 910, and the signal transmitter 116 transmits the varied voltage value of the variable-voltage circuit 112 to the signal receiving unit 910 of the display device 900g. The signal generating unit 930 is coupled to the signal receiving unit 910 and the display unit 920, and the signal generating unit 930 generates the color signal based on the varied voltage value received via the signal receiving unit 910, such that the display unit 920 is enabled to display a color on a trace formed by the pen body 100g on the display device 900 according to the color signal. In other words, in this embodiment, the color signal is generated from the display device 900g based on the received varied voltage value, instead of generated from the pen body 100g. Therefore, requirement for hardware or software performance of the pen body 100g can be reduced. In some embodiments, the signal generating unit 930 can be implemented by hardware, software or firmware in the display device 900g.

Similar to the foregoing signal generating unit 114, the signal generating unit 930 in this embodiment can also include a color lookup table. The color lookup table comprises a plurality of colors to which voltage values correspond. In particular, the color lookup table defines different colors based on different voltage value ranges. The user can choose any one of the detachable accessories 200 to assemble to the pen body 100, such that the variable-voltage circuit 112 can electrically connect to the electronic component 210 of the detachable accessory 200, thereby varying the voltage value of the variable-voltage circuit 112. The signal transmitter 116 transmits the varied voltage value of the variable-voltage circuit to the signal receiving unit 910 of the display device 900g. The signal generating unit 930 can map the varied voltage value received via the signal receiving unit 910 to the color lookup table, determine the voltage value range to which the varied voltage value corresponds, and determine the color to which the voltage value range corresponds, so as to generate the corresponding color signal. The signal generating unit 930 is configured to transmit the color signal to the display unit 920, such that the display device 900g is enabled to display the color on the trace formed by the pen body 100g on the display device 900g according to the color signal.

In some embodiments, the display device control kit (not shown in this figure) comprises the foregoing display device control pen, the display device 900g, the penholder and at least one accessory securing structure, and the display device control pen comprises the pen body 100g and at least one detachable accessory 200, and structures and corresponding features of the penholder, and the accessory securing structure can be referred to the foregoing penholder 20, 20d, 20e or 20f and the accessory securing structure 30, 30d, 30e or 30f, and the identical features are therefore not described repeatedly.

Figure 17:
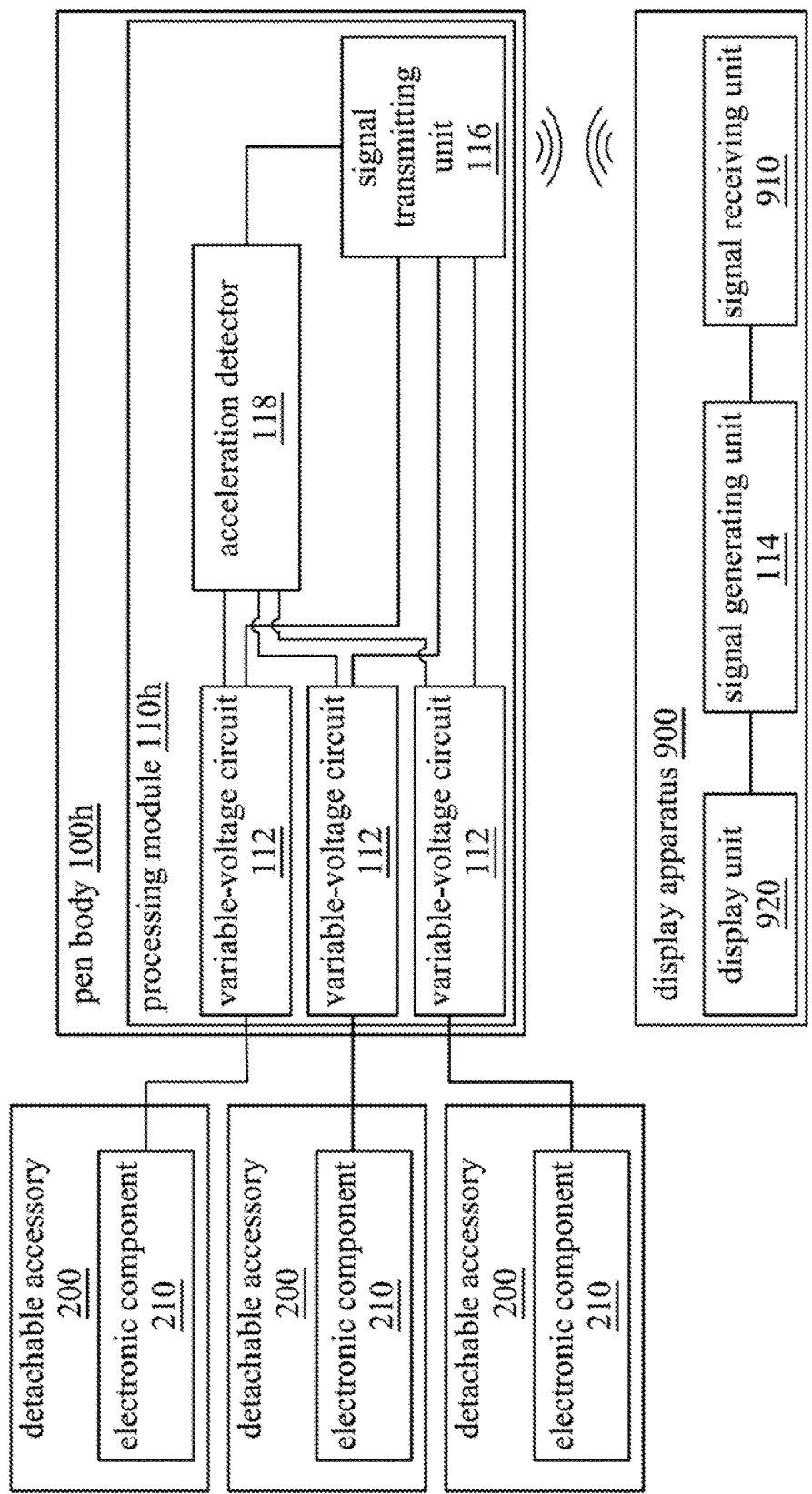
FIG. 17 is a block diagram of a display device control module in accordance with another embodiment of the present disclosure.

FIG. 17 is a block diagram of a display device control module in accordance with another embodiment of the present disclosure. As shown in FIG. 17, the display device control module may be similar to that of FIG. 16, and it comprises a display device control pen and a display device 900h, in which structures, elements and corresponding features of the display device control pen can be referred to the foregoing display device control pen 10, 10d, 10e and 10f. For example, the display device control pen may include the foregoing detachable accessory 200, and the variable-voltage circuit 112 may include an analog-to-digital converter (ADC), and the circuit diagram thereof is the same as which is shown in FIG. 4. The pen body 100h comprises the first pen shaft, the second pen shaft and the touch portion as well, and arrangement of these elements can be referred to FIGS. 2, 5 and 6 and the foregoing related context, and the identical features are therefore not described repeatedly. Difference between the embodiment in FIG. 17 and that in FIG. 11 is described as follows. The pen body 100h of the display device control pen and plural detachable accessories 200 are detachably assembled. The processing module 110h of the pen body 100h comprises the variable-voltage circuit 112 and the signal transmitter 116, but it does not include the signal generating unit. A plurality of variable-voltage circuits 112 are included in this embodiments, and these variable-voltage circuits 112 are coupled to the signal transmitter 116. The signal transmitter 116 is configured to transmit the varied voltage values of the variable-voltage circuits 112. The display device 900h comprises the signal receiving unit 910, the display unit 920 and signal generating unit 930. The signal transmitter 116 is coupled to the signal receiving unit 910, and signal generating unit 930 of the display device 900h is coupled to the signal receiving unit 910 and the display unit 920. The signal transmitter 116 transmits the varied voltage values of the variable-voltage circuits 112 to the signal receiving unit 910 of the display device 900g. Then, the signal receiving unit 910 transmits the varied voltage values of the variable-voltage circuits 112 to the signal generating unit 930. The signal generating unit 930 comprises a color lookup table and a color mixing lookup table. The color lookup table comprises a plurality of colors to which a plurality of voltage values correspond, and the color mixing lookup table comprises a plurality of mixed colors to which a plurality of color combinations correspond. More particularly, the color lookup table defines different colors based on different voltage value ranges, and the color mixing lookup table defines different mixed colors based on different color combinations.

The signal generating unit 930 can store the varied voltage values of the variable-voltage circuits 112. The signal generating unit 930 can map one of the varied voltage values or all of the varied voltage values to the color lookup table. The signal generating unit 930 can determine the color to which the varied voltage value corresponds, so as to generate the corresponding color signal. Selectively, the signal generating unit 930 can determine colors to which the varied voltage values correspond, map the determined colors to the color mixing lookup table, and determine the mixed color to which the combination of the determined colors corresponds, so as to generate the corresponding color signal. In other words, when plural detachable accessories 200 are assembled to the pen body 10h, the signal generating unit 930 can map selectively one of the varied voltage values to the color lookup table, determine a monochrome color to which the varied voltage value corresponds, so as to generate a monochrome color signal. Selectively, the signal generating unit 930 can map the varied voltage values to the color lookup table, determine the colors to which the varied voltage values correspond, map the determined colors to the color mixing lookup table, determine the mixed color to which the combination of the colors corresponds, and generate a mixed color signal. Therefore, the signal generating unit 930 can transmit the monochrome color signal or the mixed color signal generated to the display unit 920, so that the display unit 920 can display the corresponding monochrome color or mixed color on the trace formed by the pen body 100h on the display device 900h according the monochrome color signal or the mixed color signal.

In some embodiments, the processing module 110h of the pen body 100h may also include the forgoing acceleration sensor 118 which can generate the color switching signal based on the shake or the movement of the pen body 100h to change the displayed color of the display device 900. More particularly, the acceleration sensor 118 can be configured to detect the movement of the pen body 100h and to output an activating signal to activate the variable-voltage circuit 112 and the signal transmitter 116 when the movement of the pen body 100h is detected. After the acceleration sensor 118 outputs the activating signal, the acceleration sensor 118 keeps detecting the movement of the pen body 100h to output a color switching signal. The signal transmitter 116 receives the color switching signal and transmits it to the signal receiving unit 910. The signal receiving unit 910 transmits the color switching signal to the signal generating unit 930. The signal generating unit 930 is adapt to generate one of the monochrome and mixed color signals according to a predetermined mapping sequence and transmits the generated color signal to the signal transmitter 116.

For example, when three detachable accessories 200 are assembled to the pen body 100h such that three electronic components 210 are respectively electrically connected to three variable-voltage circuits 112, the three variable-voltage circuits 112 can respectively output a first voltage value, a second voltage value and a third voltage value and can transmit these voltage values to the signal receiving unit 910 via the signal transmitter 116. The signal receiving unit 910 transmits the first voltage value, the second voltage value and the third voltage value to the signal generating unit 930. The signal generating unit 930 acknowledges that there are three detachable accessories 200 encircling the pen body 100h. The signal generating unit 930 receives and stores the first voltage value, the second voltage value and the third voltage value. The signal generating unit 930 maps the first voltage value, the second voltage value and the third voltage value to the color lookup table. The signal generating unit 930 determines three colors, such as red, orange and green, to which the first voltage value, the second voltage value and the third voltage value correspond. The signal generating unit 930 maps the three determined colors to the color mixing lookup table. The signal generating unit 930 determines the mixed color, such as brown, to which the combination of the three determined colors corresponds. The signal generating unit 930 generates the mixed color signal based on the determined mixed color and transmits the mixed color signal to the display unit 920. Thereafter, when the acceleration sensor 118 detects the movement of the pen body 100h and outputs a color switching signal, the signal transmitter 116 receives the color switching signal and transmits to the signal receiving unit 910, and the signal receiving unit 910 transmits the color switching signal to the signal generating unit 930. The signal generating unit 930 is adapt to generate one of the monochrome and mixed color signals according to a predetermined mapping sequence and transmits the generated color signal to the display unit 920. For example, the predetermined mapping sequence is determined as follows. After the foregoing mixed color signal is outputted, when the signal generating unit 930 receives the color switching signal, the signal generating unit 930 reads the first voltage value, maps the first voltage value to the color lookup table, determines a first monochrome color, such as red, to which the first voltage value corresponds, and generates the first monochrome color signal. Afterwards, when the acceleration sensor 118 detects the movement of the pen body 100h and outputs a color switching signal again, the signal generating unit 930 receives the color switching signal via the signal transmitter 116 and the signal receiving unit 910, and the predetermined mapping sequence is determined as follows. After the first monochrome color signal is outputted, when the signal generating unit 930 receives the color switching signal, the signal generating unit 930 reads the second voltage value, maps the second voltage value to the color lookup table, determines a second monochrome color, such as orange, to which the second voltage value corresponds, and generates the second monochrome color signal. Thereafter, when the acceleration sensor 118 detects the movement of the pen body 100h and outputs a color switching signal again, the signal generating unit 930 receives the color switching signal via the signal transmitter 116 and the signal receiving unit 910, and the predetermined mapping sequence is determined as follows. After the second monochrome color signal is outputted, when the signal generating unit 930 receives the color switching signal, the signal generating unit 930 reads the third voltage value, maps the third voltage value to the color lookup table, determines a third monochrome color, such as green, to which the third voltage value corresponds, and generates the third monochrome color signal. Then, when the acceleration sensor 118 detects the movement of the pen body 100h and outputs a color switching signal again, the signal generating unit 930 receives the color switching signal via the signal transmitter 116 and the signal receiving unit 910, and the predetermined mapping sequence is determined as follows. After the third monochrome color signal is outputted, when the signal generating unit 930 receives the color switching signal, the signal generating unit 930 reads the first, second and third voltage values and generates the mixed color signal according to the aforementioned mixed color determining process.

In other words, the color switching signal can be outputted based on the detecting result from the acceleration sensor 118, such as whether the pen body is shaken or moved. This color switching signal can control the signal generating unit 930 to change the outputted color signal.

In some embodiments, the display device control kit (not shown in this figure) comprises the foregoing display device control pen, the display device 900h, the penholder and at least one accessory securing structure, and the display device control pen comprises the pen body 100h and at least one detachable accessory 200, and structures and corresponding features of the penholder, and the accessory securing structure can be referred to the foregoing penholder 20, 20d, 20e or 20f and the accessory securing structure 30, 30d, 30e or 30f, and the identical features are therefore not described repeatedly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display device control pen, comprising:
   at least one detachable accessory, wherein the detachable accessory comprises an electronic component; and
   a pen body detachably assembled with the detachable accessory, the pen body comprising:
   at least one variable-voltage circuit, wherein the electronic component is electrically connected to the variable-voltage circuit and varies a voltage value of the variable-voltage circuit when the detachable accessory is assembled to the pen body;
   a signal generating unit coupled to the variable-voltage circuit and configured to generate a color signal based on the varied voltage value; and
   a signal transmitter coupled to the signal generating unit and configured to transmit the color signal to a display device, such that the display device is enabled to display a color on a trace formed by the pen body according to the color signal.

2. The display device control pen of claim 1, wherein the signal generating unit comprises a color lookup table and a color mixing lookup table, and the color lookup table comprises a plurality of colors to which a plurality of voltage values correspond, and the color mixing lookup table comprises a plurality of mixed colors to which a plurality of color combinations correspond.

3. The display device control pen of claim 2, wherein quantities of the at least one detachable accessory are a plurality of the detachable accessories, a plurality of the electronic components of a plurality of the detachable accessories respectively have different impedance values, and quantities of the at least one variable-voltage circuit are a plurality of the variable-voltage circuits, the electronic components are respectively electrically connected to the variable-voltage circuits and vary the voltage value of each of the variable-voltage circuits when the detachable accessories are assembled to the pen body, wherein the signal generating unit maps the varied voltage values of the variable-voltage circuits to the color lookup table, determines the colors to which the varied voltage values correspond, maps the determined colors to the color mixing lookup table, and determines the mixed color to which the determined colors correspond, so as to generate the color signal.

4. The display device control pen of claim 3, wherein quantities of the at least one detachable accessory are a plurality of the detachable accessories, a plurality of the electronic components of a plurality of the detachable accessories respectively have different impedance values, and quantities of the at least one variable-voltage circuit are a plurality of the variable-voltage circuits, the electronic components are respectively electrically connected to a plurality of the variable-voltage circuits and vary the voltage value of each of the variable-voltage circuits when the detachable accessories are assembled to the pen body, wherein the signal generating unit maps selectively one of the varied voltage values of the variable-voltage circuits to the color lookup table and determines the color to which the varied voltage value corresponds, so as to generate the color signal.

5. The display device control pen of claim 4, further comprising an acceleration sensor coupled to the variable-voltage circuit, the signal generating unit and the signal transmitter, wherein the acceleration sensor is configured to detect a movement of the pen body to output a color switching signal, and the signal generating unit is adapt to generate one of a plurality of the color signals according to a predetermined mapping sequence and transmits the color signal to the signal transmitter after receiving the color switching signal.

6. The display device control pen of claim 5, wherein the acceleration sensor is configured to detect the movement of the pen body to further output an activating signal to activate the variable-voltage circuit, the signal generating unit and the signal transmitter, and the acceleration sensor keeps detecting the movement of the pen body to output the color switching signal after outputting the activating signal.

7. The display device control pen of claim 1, wherein the pen body comprises at least one electrical connection portion configured to electrically connect to the variable-voltage circuit, the detachable accessory comprises at least one electrical pin portion configured to electrically connect to the electronic component, wherein the electrical pin portion is electrically connected to the electrical connection portion when the detachable accessory is assembled to the pen body.

8. The display device control pen of claim 7, wherein the pen body further comprises a first pen shaft and a second pen shaft, the first pen shaft is axially connected to the second pen shaft, a diameter of the first pen shaft is less than that of the second pen shaft, the electrical connection portion is located on the first pen shaft, and the detachable accessory encircles the first pen shaft.

9. The display device control pen of claim 8, wherein the detachable accessory comprises an inner wall, the inner wall forms a hole, and the inner wall has an opening, when the detachable accessory encircles the first pen shaft by the hole, the inner wall surrounds the first pen shaft, and the electrical pin portion protrudes from the opening of the inner wall to electrically connect to the electrical connection portion.

10. The display device control pen of claim 9, wherein the electrical pin portion is elastic and compressible by the electrical connection portion.

11. The display device control pen of claim 7, wherein the electrical pin portion of the detachable accessory is assembled to the electrical connection portion of the pen body in a pluggable manner, in a fastening manner or in a magnetic attraction manner.

12. The display device control pen of claim 1, wherein the display device comprises a signal receiving unit and a display unit, the signal receiving unit is coupled to the signal transmitter and the display unit, the display device receives the color signal via the signal receiving unit, such that the display unit displays the color on the trace formed by the pen body according to the color signal.

13. A display device control kit, comprising:
   a display device control pen of claim 1;
   a penholder having a pen body accommodating recess, the pen body of the display device control pen being pluggably accommodated in the pen body accommodating recess; and
   at least one accessory securing structure located on the penholder and configured to secure the detachable accessory when the detachable accessory is detached from the pen body.

14. The display device control kit of claim 13, wherein the accessory securing structure is a stick-shaped object.

15. A display device control module, comprising:
   a display device control pen comprising:
      at least one detachable accessory, wherein the detachable accessory comprises an electronic component; and
      a pen body detachably assembled with the detachable accessory, the pen body comprising:
         at least one variable-voltage circuit, wherein the electronic component is electrically connected to the variable-voltage circuit and varies a voltage value of the variable-voltage circuit when the detachable accessory is assembled to the pen body; and
         a signal transmitter coupled to the variable-voltage circuit and configured to transmit the varied voltage value of the variable-voltage circuit; and
   the display device comprising:
      a signal receiving unit coupled to the signal transmitter and configured to receive the varied voltage value of the variable-voltage circuit;
      a signal generating unit coupled to the signal receiving unit and configured to generate a color signal based on the varied voltage value; and
      a display unit coupled to the signal generating unit and configured to display a color on a trace formed by the pen body according to the color signal.

16. The display device control module of claim 15, wherein the signal generating unit comprises a color lookup table and a color mixing lookup table, and the color lookup table comprises a plurality of colors to which a plurality of voltage values correspond, and the color mixing lookup table comprises a plurality of mixed colors to which a plurality of color combinations correspond.

17. The display device control module of claim 16, wherein quantities of the at least one detachable accessory are a plurality of the detachable accessories, a plurality of the electronic components of a plurality of the detachable accessories respectively have different impedance values, and quantities of the at least one variable-voltage circuit are a plurality of the variable-voltage circuits, the electronic components are respectively electrically connected to a plurality of the variable-voltage circuits and vary the voltage value of each of the variable-voltage circuits when the detachable accessories are assembled to the pen body, wherein the signal transmitter transmits a plurality of the varied voltage values of the variable-voltage circuits to the signal receiving unit, wherein the signal generating unit maps the varied voltage values of the variable-voltage circuits to the color lookup table, determines the colors to which the varied voltage values correspond, maps the determined colors to the color mixing lookup table, and determines the mixed color to which the determined colors correspond, so as to generate the color signal.

18. The display device control module of claim 16, wherein quantities of the at least one detachable accessory are a plurality of the detachable accessories, a plurality of the electronic components of a plurality of the detachable accessories respectively have different impedance values, and quantities of the at least one variable-voltage circuit are a plurality of the variable-voltage circuits, the electronic components are respectively electrically connected to a plurality of the variable-voltage circuits and vary the voltage value of each of the variable-voltage circuits when the detachable accessories are assembled to the pen body, the signal transmitter transmits a plurality of the varied voltage values of the variable-voltage circuits to the signal receiving unit, wherein the signal generating unit maps selectively one of the varied voltage values of the variable-voltage circuits to the color lookup table and determines the color to which the varied voltage value corresponds, so as to generate the color signal.

19. The display device control module of claim 18, further comprising an acceleration sensor coupled to the variable-voltage circuit and the signal transmitter, wherein the acceleration sensor is configured to detect a movement of pen body to output a color switching signal, the signal transmitter transmits the color switching signal to the signal receiving unit, the signal receiving unit transmits the color switching signal to the signal generating unit, and the signal generating unit receives the color switching signal and is adapt to generate one of a plurality of the color signals according to a predetermined mapping sequence and transmits the color signal to the display unit.

20. The display device control module of claim 19, wherein the acceleration sensor is configured to detect the movement of the pen body to further output an activating signal to activate the variable-voltage circuit and the signal transmitter, and the acceleration sensor keeps detecting the movement of the pen body to output the color switching signal after outputting the activating signal.

21. The display device control module of claim 15, wherein the pen body comprises at least one electrical connection portion configured to electrically connect to the variable-voltage circuit, the detachable accessory comprises at least one electrical pin portion configured to electrically connect to the electronic component, wherein the electrical pin portion is electrically connected to the electrical connection portion when the detachable accessory is assembled to the pen body.

22. The display device control module of claim 21, wherein the pen body further comprises a first pen shaft and a second pen shaft, the first pen shaft is axially connected to the second pen shaft, a diameter of the first pen shaft is less than that of the second pen shaft, the electrical connection portion is located on the first pen shaft, and the detachable accessory encircles the first pen shaft.

23. The display device control module of claim 22, wherein the detachable accessory comprises an inner wall, the inner wall forms a hole, and the inner wall has an opening, when the detachable accessory encircles the first pen shaft by the hole, the inner wall surrounds the first pen shaft, and the electrical pin portion protrudes from the opening of the inner wall to electrically connect to the electrical connection portion.

24. The display device control module of claim 23, wherein the electrical pin portion is elastic and compressible by the electrical connection portion.

25. The display device control module of claim 21, wherein the electrical pin portion of the detachable accessory is assembled to the electrical connection portion of the pen body in a pluggable manner, in a fastening manner or in a magnetic attraction manner.

26. A display device control kit, comprising:
a display device control pen of claim 15;
a penholder having a pen body accommodating recess, the pen body of the display device control pen being pluggably accommodated in the pen body accommodating recess; and
at least one accessory securing structure located on the penholder and configured to secure the detachable accessory when the detachable accessory is detached from the pen body.

27. The display device control kit of claim 26, wherein the accessory securing structure is a stick-shaped object.

* * * * *